I. H. GARRETSON.
Seed-Planter.
No. 9,636. Patented Mar. 29, 1853.
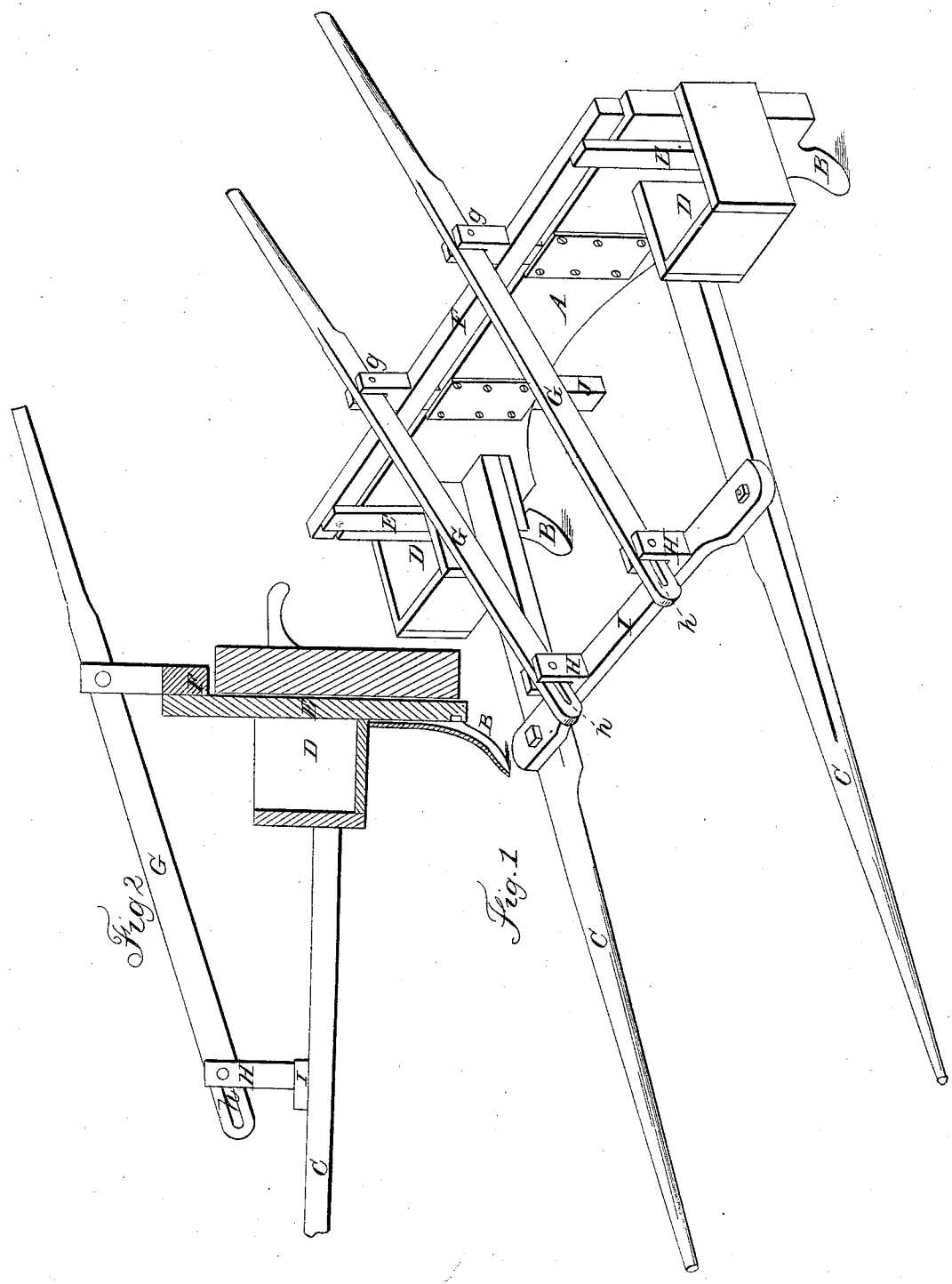

UNITED STATES PATENT OFFICE.

ISAAC H. GARRETSON, OF RICHLAND, IOWA.

IMPROVEMENT IN SEED-PLANTERS.

Specification forming part of Letters Patent No. 9,636, dated March 29, 1853.

*To all whom it may concern:*

Be it known that I, I. H. GARRETSON, of Clay, in the county of Washington and State of Iowa, have invented certain new and useful Improvements in Corn-Planters, of which the following is a full, clear, and exact description, reference being had to the accompanying drawings, which form part of this specification, and in which—

Figure 1 is a view in perspective of such portions of the corn-planter as relate to my improvements; Fig. 2, a vertical longitudinal section of the same through one of the grain troughs or boxes.

With most or all corn-planting machines it is customary for the discharge of the grain to be regulated by the measurement of surface traveled over by the propelling or running wheels of the machine, the corn being distributed at intervals through a slide or its equivalent operated by suitable mechanical devices from one or both of the propelling-wheels. Such machines, if planting over a level surface, would distribute the corn in hills at or about equal distances apart in direction of the machine's linear progress in space; but as all ground is more or less undulating or uneven the hills of corn planted by such a machine will of necessity stand at unequal distances apart by reason of the periods of the distribution of the corn being governed by the surface distance the wheels pass over, and not by the linear progress of the machine. It is a desideratum to obtain some contrivance for planting the corn in hills at equal or regular distances apart.

To accomplish this I propose to construct and operate the corn-planter as follows: A cross-frame or timber, A, of the planter is fitted near either end with cultivators B, whose distance apart measures the required distances between the hills of corn in one direction. These cultivators perform two distinct offices: first, to mark out and allot the land for the equal disposition or arrangement of the hills, and, secondly, to plow the furrows in which the corn is deposited. The action of these cultivators I shall presently further explain more fully. The shafts C, to which the horse for drawing the planter is harnessed, are of the usual construction. The hoppers D for containing the corn are attached centrally over the cultivators B to the frame A. These hoppers are fitted with vertical slides E, each of which has a notch or recess, e, made in its front side, to receive corn at suitable intervals from the hopper and discharge it at the proper periods in the wake of the cultivators. Both slides E are operated upon simultaneously, being connected by a bar, F, which is raised and lowered, as required, from the back by hand-levers G, pivoted to the bar F at $g$, and hinged through slots $h$ to fulcra H H, projecting from a cross-brace, I. Guides J, connected with the cross-bar F and working through boxes attached to the frame A, serve to preserve the straight or vertical movement of the bar F as it is raised or lowered, and obviate friction or undue wear of the discharging-slides E.

To operate this planter it is first proposed simply to mark out the land by the cultivators B, the slides E being allowed to remain stationary, so as neither to receive nor discharge corn. For "marking out" the machine is run across the field—say in direction of its length or breadth, as may be—forming parallel furrows at equal distances apart. This being done and the hoppers D filled with corn, the machine is then situated for traversing the field at right angles to the furrows made in marking out, and as it is set in motion for the formation of parallel cross-furrows at equal distances apart the attendant upon the machine takes hold with his hands of the back ends of the levers G to elevate and depress at suitable intervals the slides E, which, during the formation of the cross-furrows, are operated as follows: The slides E being raised, so that the notches $e$ enter the grain-hoppers to receive the necessary number of kernels for a hill of corn, then when the planter, in forming the cross-furrows, arrives at the first marking-out furrow crossing it at right angles, or rather when the cultivators B reach that point, the hands of the attendant are brought to bear upon the levers G to depress them suddenly, so that the notches $e$ are lowered beyond the vertical interior or covering surfaces of the cultivator-shanks and drop or deposit the kernels with which they were loaded. This being done, and as the planter continues its progress over the first marking-out furrow, the levers G are rapidly raised again by hand for the reception of another supply of corn to the notches $e$ for similar sudden deposit of the corn in the second or next parallel marking-out furrow, and so on for each intersecting furrow. The cultivators, in planting, cross over the field and back again in parallel courses till the planting is completed. Thus it will be seen, whatever the irregularity of the earth's surface, the corn will be planted in hills at each junction of the furrows crossing each other at right angles, or at every corner, as it were, of a square the sides of which measure the same distances as the space between the cultivators B B, so that the corn, as it grows, will present rows in the direction of the sides of the said squares.

What I claim, and desire to secure by Letters Patent, is—

Planting corn in check-rows by means of the planting-slides E, worked on the cross-bar F by hand, in the manner set forth.

In testimony whereof I have hereunto signed my name before two subscribing witnesses.

ISAAC H. GARRETSON.

Witnesses:
B. K. MORSELL,
J. DENNIS, Jr.